United States Patent
Breitbart et al.

(10) Patent No.: US 6,697,338 B1
(45) Date of Patent: Feb. 24, 2004

(54) DETERMINATION OF PHYSICAL TOPOLOGY OF A COMMUNICATION NETWORK

(75) Inventors: Yuri Breitbart, Madison, NJ (US); Minos N. Garofalakis, Chatham, NJ (US); Clifford Eric Martin, Martinsville, NJ (US); Rajeev Rastogi, New Providence, NJ (US); Srinivasan Seshadri, Basking Ridge, NJ (US); Abraham Silberschatz, Warren, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/428,419

(22) Filed: Oct. 28, 1999

(51) Int. Cl.[7] ............................................... H04L 12/28
(52) U.S. Cl. ....................................................... 370/254
(58) Field of Search ................................ 370/254, 255, 370/256, 257, 258

(56) References Cited

U.S. PATENT DOCUMENTS

| | | | |
|---|---|---|---|
| 5,297,138 A | | 3/1994 | Black |
| 5,432,789 A | | 7/1995 | Armstrong |
| 5,465,251 A | * | 11/1995 | Judd et al. |
| 5,606,664 A | | 2/1997 | Brown |
| 5,684,796 A | | 11/1997 | Abidi |
| 5,684,959 A | | 11/1997 | Bhat |
| 5,708,772 A | | 1/1998 | Zeldin |
| 5,710,885 A | * | 1/1998 | Bondi |
| 5,727,157 A | | 3/1998 | Orr |
| 5,729,685 A | | 3/1998 | Chatwani |
| 5,732,086 A | | 3/1998 | Liang |
| 5,734,824 A | * | 3/1998 | Choi |
| 5,737,319 A | | 4/1998 | Croslin |
| 5,850,397 A | | 12/1998 | Raab |
| 5,884,036 A | | 3/1999 | Haley |
| 5,903,559 A | * | 5/1999 | Acharya |
| 5,926,462 A | | 7/1999 | Schenkel |
| 5,933,416 A | | 8/1999 | Schenkel |
| 6,075,776 A | * | 6/2000 | Tanimoto |
| 6,108,702 A | * | 8/2000 | Wood |
| 6,205,122 B1 | * | 3/2001 | Sharon et al. |
| 6,324,168 B1 | * | 11/2001 | Richardson |
| 6,331,985 B1 | * | 12/2001 | Coden |
| 6,469,987 B1 | * | 10/2002 | Rijhsinghani |

* cited by examiner

Primary Examiner—Kwang Bin Yao

(57) ABSTRACT

Physical connectivity is determined between elements such as switches and routers in a multiple subnet communication network. Each element has one or more interfaces each of which is physically linked with an interface of another network element. Address sets are generated for each interface of the network elements, wherein members of a given address set correspond to network elements that can be reached from the corresponding interface for which the given address set was generated. The members of first address sets generated for corresponding interfaces of a given network element, are compared with the members of second address sets generated for corresponding interfaces of network elements other than the given element. A set of candidate connections between an interface of the given network element and one or more interfaces of other network elements, are determined. If more than one candidate connection is determined, connections with network elements that are in the same subnet as the given network element are eliminated from the set.

14 Claims, 6 Drawing Sheets

DETERMINATION OF PHYSICAL TOPOLOGY OF A COMMUNICATION NETWORK

BACKGROUND OF THE INVENTION

1. Field of the Invention

This invention relates to a technique for determining a topology of a communication network.

2. Discussion of the Known Art

Physical network topology refers to the physical connectivity represented by links such as, for example, twisted wire pairs, fiber optic or wireless links that exist among elements such as switches and routers in a communication network. This topology is part of a so-called physical layer or layer-1 of a known seven-layer ISO network model standard. Determining the physical interconnections of network elements is a prerequisite to certain critical network management tasks including, e.g., reactive and proactive resource management, server siting, event. correlation, and root-cause analysis.

For example, consider a fault monitoring and analysis application running on a central Internet Protocol (IP) network management platform. Typically, a single fault in the network causes multiple alarm signals from different interrelated network elements. Knowledge of the physical interconnections among the elements is essential to discriminate secondary alarm signals, and to correlate primary signals in order to isolate the actual failure site in the network. See, e.g., I. Katzela and M. Schwarz, Schemes for Fault Identification in Communication Networks, 3 IEEE/ACM Transactions on Networking, at 753-64 (Dec. 1995). Further, an accurate map of physical interconnections in a communication network enables a proactive analysis of the impact of element and link failures. Early identification of potential failure sites capable of disrupting a large number of network users, allows a network manager to enhance the survivability of the network, for example, by adding alternate routing paths before outages occur.

Certain systems, including Hewlett Packard's Open View Network Node Manager, and IBM's Tivoli for AIX, feature an IP mapping function for discovering routers and subnets, and for generating a network layer (i.e., ISO layer-3) topology showing router-to-router interconnections and router-to-subnet relationships. But a layer-3 topology tends to ignore complex physical interconnections of layer-1 network elements such as switches and bridges that comprise one or more subnets of the network. Thus, a network manager is not fully able to troubleshoot end-to-end connectivity, or to assess the potential impact of a link or device failure in a switched network based only on layer-3 topology information.

U.S. Pat. No. 5,727,157 (Mar. 10, 1998) relates to an apparatus and method for determining a computer network topology. According to the patent, a list of network addresses heard at each port of a data-relay device in a computer network is compiled for each device. Each device acquires a source address table listing addresses heard by each port of the device. The lists are compared to determine the existence of a direct or transitive connection between selected ports on different devices, to define interconnections between the devices in the network. The patented method does not, however, contemplate the existence of multiple subnets in the network. Thus, the method may not always generate an accurate topology of physical interconnections in networks that have more than one subnet.

U.S. Pat. No. 5,933,416 (Aug. 3, 1999) and U.S. Pat. No. 5,926,462 (Jul. 20, 1999) disclose a method of determining a network topology, involving monitoring traffic received by and emitted out of devices in the network. Traffic out of the devices is correlated with traffic into the devices, and a communication path between a pair of devices is indicated when the correlation of traffic out of one of the devices with traffic into another one of the devices, exceeds a predetermined threshold. The patented methods predict with a certain probability a physical connection between two nodes, but do not confirm the existence of such a connection between the nodes, however.

U.S. Pat. No. 5,850,397 (Dec. 15, 1998); U.S. Pat. No. 5,708,772 (Jan. 13, 1998); and U.S. Pat. No. 5,606,664 (Feb. 25, 1997) relate to apparatus and methods of determining a topology of a non-heterogeneous network, using proprietary information tables associated with the network elements.

U.S. Pat. No. 5,729,685 (Mar. 17, 1998) relates to apparatus for determining the topology of an asynchronous transfer mode (ATM) network, and U.S. Pat. No. 5,684,959 (Nov. 4, 1997) discloses a method of determining a topology of a fiber distributed data interface (FDDI) network. Neither of the two patents is expandable to arbitrary networks that include bridges, switches, hubs and the like.

U.S. Pat. No. 5,297,138 (Mar. 22, 1994) relates to determining a topology of a network consisting of repeaters, concentrators and bridges, and requires significant packet content monitoring. U.S. Pat. No. 5,684,796 (Nov. 4, 1997) discloses a method and apparatus for determining and maintaining agent topology information in a multi-segment, non-heterogeneous network, and U.S. Pat. No. 5,737,319 relates to a topology discovery method applicable only to static networks and not to data networks with rapidly changing topology. None of the foregoing patents presents a practical solution for discovering a physical or layer-1 topology in a heterogeneous (multi-vendor) IP network, in which more than one subnet may exist.

SUMMARY OF THE INVENTION

According to the invention, a method of discovering a physical topology of a network having elements each of which is assigned to one of a number of subnets within the network, wherein each element has one or more interfaces each of which is linked with an interface of another element, includes generating address sets for each interface of each network element, wherein members of a given address set correspond to network elements that can be reached from the interface for which the given address set was generated, and comparing members of first address sets generated for corresponding interfaces of a given network element with members of second address sets generated for corresponding interfaces of network elements other than the given element. A set of candidate connections between one or more interfaces of the given element and one or more interfaces of another network element are determined, such that, for each candidate connection, (a) none of the members of a first address set is also a member of a second address set, and (b) the members of the first address set and the members of the second address set together represent all network elements assigned to each subnet represented by the members of the first and the second address sets.

If only one candidate connection is determined between a first interface of the given network element and a second interface of another network element, the one candidate connection is identified as an actual connection between the elements. If more than one candidate connection is determined, those connections with other network elements that are in the same subnet as the given network element are eliminated from the set of the candidate connections.

For a better understanding of the invention, reference is made to the following description taken in conjunction with the accompanying drawing and the appended claims.

DETAILED DESCRIPTION OF THE INVENTION

The present topology discovery technique makes use of network information that typically is collected in known SNMP Management Information Bases (MIBs) associated with network elements. No modification of operating system software running on the elements or on any hosts, is required. Specifically, the present technique may incorporate information from address forwarding tables of the elements, e.g., the set of Medium Access Control (MAC, or ISO layer-2) addresses that are reachable from each element interface. In the presently disclosed technique, this information is then used to identify interconnections between network elements such as routers and switches to arrive at a physical network topology. In heterogeneous networks having elements from different vendors, the requisite address forwarding data may need to be gathered by accessing and interpreting MIB variables stored in vendor-specific private MIBs, or in custom-designed files.

Figure 1:
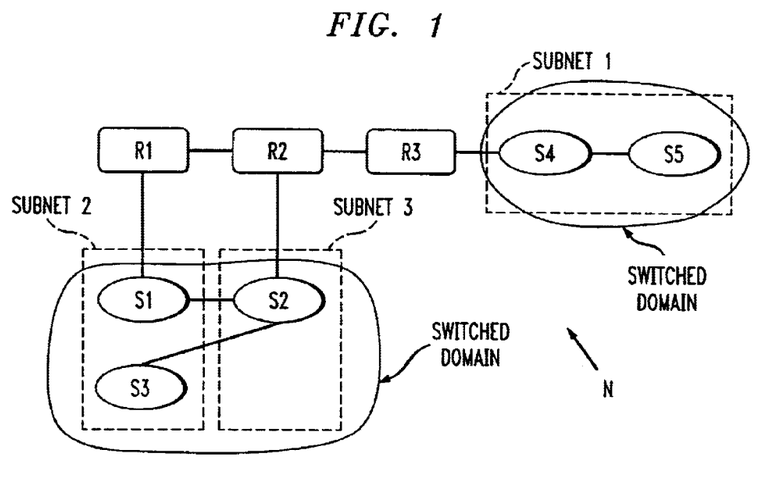
FIG. 1 is a representation of a switched communication network having multiple subnets.

IP networks typically comprise switched domains having multiple subnets, with elements (nodes) of the different subnets often being directly physically connected to one another, as in FIG. 1. Therefore, one element can be completely invisible (logically) to a neighboring element with which it is physically linked, if the two elements belong to different subnets of the network. Nonetheless, the present topology discovery technique is capable of identifying an accurate physical topology of a broad class of networks having multiple subnets using address forwarding information alone, as described below.

Element address forwarding tables typically employ an aging mechanism that discards infrequently encountered destination MAC addresses from an address cache. Thus, sets of MAC addresses found in these tables may not necessarily be complete. This problem may be resolved using either one or a combination of the following techniques:

1. Generate extra network traffic across switches (using the known IP "ping" mechanism) to ensure that the address forwarding tables are adequately populated; and
2. Employ reasonable approximations, noted below, concerning whether or not two particular elements could in fact be interconnected.

Because it is unlikely that accumulated address forwarding information for a particular element interface is complete without an inordinate amount of extra traffic, a hybrid of steps (1) and (2) above will likely work best in practice.

Virtual local area networks (VLANs) allow IP network managers to break a linkage between physical and logical connections in a network, by assigning the interfaces of a single network element to different subnets. The present topology discovery technique may be applied to VLANs if the VLAN interface assignments, available in most proprietary MIBs, are known.

Consider a domain whose physical topology is to be discovered, as a management domain communication network N in FIG. 1. Also assume that nodes in the network correspond to network elements, for example and without limitation, routers (R), and switches (S) each of which switches serves a group of users or hosts having different IP addresses in the network N. A m direct physical connection between a pair of interfaces belonging to different network elements is referred to as an "edge" between the corresponding nodes of the network.

Define a switched domain to be the maximal set S of switches such that there is a path in network N between every pair of switches in S, involving only switches in S. In FIG. 1, R1, R2, and R3 are routers, while S1 through S5 are switches forming two distinct switched domains (S1, S2, S3), and (S4, S5). Further, define a subnet as the maximal set of IP addresses such that any two elements within a subnet can communicate (at ISO layer-3 or above) with each other without directing traffic through a router. Note that a switched domain may comprise parts of different subnets, and that communication between switches of different subnets must be directed through a router. Also assume in FIG. 1 that the switched domain (S4, S5) contains only one subnet (subnet 1), while the switched domain (S1, S2, S3) contains two subnets, one containing S1 and S3 (subnet 2), and the other containing 52 (subnet 3).

A packet from S1 to S2 is routed first to R1 which determines that since S2 is in a different subnet than S1 (i.e., S2 is not "local" to S1), S1's packet is sent from R1 to R2, the latter being the router assigned to S2's subnet, despite the existence of a direct physical connection between S1 and S2. R2 then sends S1's packet to S2. Also, in FIG. 1, a packet from S1 to S3 is first sent to R1, which determines that since S3 is in the same subnet as S1, S1 may communicate "directly" with S3 via the physical links with S2, even though S2 is in a different subnet than S1 and S3.

Switches in a switched domain typically employ a known spanning tree protocol to determine unique forwarding paths for each switch. See, e.g., A. S. Tanenbaum, Computer Networks, 3d ed. (Prentice Hall 1996), all relevant portions of which are incorporated by reference. The present topology discovery method may incorporate MAC addresses acquired through backward learning (id.) on interfaces that are part of the switched domain spanning tree. Therefore, edges between interfaces that are not active (i.e., are eliminated by the spanning tree protocol) may not be discovered. It is therefore assumed that all inactive edges may be ignored in the management domain network of interest.

Denote the jth port or interface of a switch Si, by Sij. For each interface Sij, a set of addresses that have been determined (by backward learning or otherwise) for that interface is referred to as the address forwarding table Aij for Sij. Typically, Aij is a set whose members are MAC addresses that have -been seen as source addresses on frames or packets received at Sij. Thus, Aij represents those nodes that can be reached to receive frames directed out from the interface Sij. Aij is considered complete if Aij contains the addresses of all switches and routers from which frames can be received at Sij. If the switched domain comprises only one subnet, the Aij represents the set of nodes in N that are reachable from Si via the interface Sij by a path in the switched domain spanning tree. In the case of multiple subnets, however, the foregoing is not necessarily true. For example, in FIG. 1, S3 will never receive a frame from S2 with S2 as the source MAC address. The reason is that if S2 (in subnet 3) has to communicate with S3 (in subnet 2), then a packet from S2 is first sent to R2, which in turn forwards it to R1. Finally, R1 forwards the frame to S3 with the source MAC address being that of R2 (even though the frame passes through S2).

Single Subnet Switched Domains

Assume that:

(i) each switched domain contains exactly one subnet, (ii) no VLANs are present in the management domain, and (iii) the address forwarding tables are complete.

Discovering Routers in the Management Domain

A set of routers in the management domain may be discovered by repeatedly identifying neighboring routers of currently known routers, until no new routers are discovered. Assume that the IP address of at least one router in the management domain, e.g., $R_1$, is known to bootstrap this process. The neighboring routers of any router R are the set of routers that are next hops for some destination in the ipRouteTable in the MIB for R. See, e.g., K. McCloghrie and M. Rose, Management Information Base for Network Management of TCP/IP-based Internets: MIB-II, Internet RFC-1213 (Mar. 1991) (hereafter MIB-II). All relevant portions of MIB-II are incorporated by reference herein. The following procedure may therefore be used for discovering the entire set of routers in the management domain.

```
Procedure FindRouters(R₁)
/* R₁ is the IP address of some known */
/* router in the management domain */
begin
  routerSet := {R₁}
  routerVisited := φ
  while routerSet ≠ φ do {
    choose a router R from routerSet
    routerSet := routerSet - {R}
    If {R} ∈ routersVisited
      continue
    routersVisited := routersVisited ∪ {R}
    NH(R) := next hops for R for some destination
    routerSet := routerSet ∪ NH(R)
  }
end
```

Discovering Switches in the Management Domain

A set of switches in the Management Domain may be identified, for example, by first discovering, for each interface of a router R, the subnet that it is directly connected to or, equivalently, the set of IP addresses D to which it can perform direct delivery. This is obtained by first obtaining the IP address of an interface of R using the ipAddrTable described in MIB-II. D is then computed by enumerating the set of IP addresses in the subnet corresponding to the IP address of an interface.

The above enumeration takes into account subnet masks and IP address formats. Once D is computed, for each IP address in D, it can be determined if it is a switch by checking for the presence of a Bridge MIB. See E. Decker, et al, Definitions of Managed Objects for Bridges, Internet RFC-1493 (Jul. 1993), all relevant portions of which are incorporated by reference. Actually, both routers and switches contain a Bridge MIB and, therefore, the value of the ipForwarding variable is used to determine if an IP address belongs to a switch or a router. If IpForwarding is equal to 1, the element is a router; otherwise it is a switch. Persons skilled in the art will understand that other known techniques for discovering switches and routers in a network may be employed.

Having discovered the set of routers and switches in the management domain, i.e., the nodes of N, the physical interconnections or edges between the nodes may be determined as follows:

Discovering the Edges in N

The edges of N are discovered one switched domain at a time. Let $\mu$ be the set of MAC addresses corresponding to the switches and the routers of a subnet S. A necessary and sufficient condition for an interface of a switch to be connected to an interface of another switch, is established by lemma (1), below.

(1) Interfaces Sij and Skl are connected to each other if, any only if, Aij∪Akl=$\mu$, and Aij∩Akl=φ.

To prove lemma (1), assume Sij and Skl are connected to each other. Clearly, Aij∩Akl=φ. Further, since the Aij's are complete, Aij∪Akl=$\mu$.

Next, assume Aij∪Akl=$\mu$ and Aij∩Akl=φ. Let, if possible, Sij and Skl not be connected to each other, let P be the path from Si to Sj in the spanning tree, and recall the assumption that all the Aij are complete. Then, there are three possibilities:

1. P contains both Sij and Skl: If so, there exists another switch Sm in P and, therefore, it can not be the case that Aij∩Akl=φ.
2. P contains exactly one of Sij or Skl. If so, once again it can not be the case that Aij∩Akl=φ.
3. P contains neither Sij nor Skl. If so, Aij∪Akl ≠$\mu$, since the union will not contain both Si and Sk.

Lemma (1) thus provides a routine to discover connections between switches in single subnet switched domains. Connections between routers and switches must also be discovered, however. A condition for a router to be connected to a switch will now be described with respect to the following definition.

A "leaf interface" of a switch Si is an interface that is not connected to an interface of any other switch.

Accordingly, an interface Sij for which there does not exist another interface Skl, such that Aij and Akl satisfy the conditions specified in lemma (1), is a leaf interface. Lemma (2) below states a necessary and sufficient condition for a router to be connected to a switch.

(2) A router R is connected to an interface Sij if and only if (a) Sij is a leaf interface, and (b) Aij contains the MAC address of R.

The edge discovery procedure based on Lemmas (1) and (2) above, may be described as follows:

```
Procedure FindInterConnections(S₁,S₂,...Sₙ,R₁,R₂,...,Rₘ)
/* S₁,S₂,...,Sₙ are the switches of a subnet S */
/* R₁,R₂,...,Rₘ are the routers of the subnet S */
begin
for each switch Sᵢ do
  for each interface j of Sᵢ do {
    If Sᵢⱼ has already been matched
```

-continued

```
        continue
    else {
        If A_ij ∪ A_kl = U and A_ij ∩ A_kl = φ
            Match S_ij with S_kl
            /* S_ij and S_kl are connected */
    }
}
for each router R_k do
    for each switch S_i do
        for each interface j of S_i do
            If S_ij is not matched and A_ij contains R_k
                Match S_ij with R_k
                /* S_if and R_k are connected */
end
```

Multiple Subnet Switched Domains

As described above, for switched domains containing a single subnet, interfaces $S_{ij}$ and $S_{kl}$ are connected if and only if the union $A_{ij} \cup A_{kl}$ contains all the nodes in the subnet, and the intersection $A_{ij} \cap A_{kl}$ is empty. Unfortunately, it can not always be assumed that switches in a given switched domain are all members of a single subnet. For example, see FIG. 1 and consider the network depicted in FIG. 2.

Figure 2:
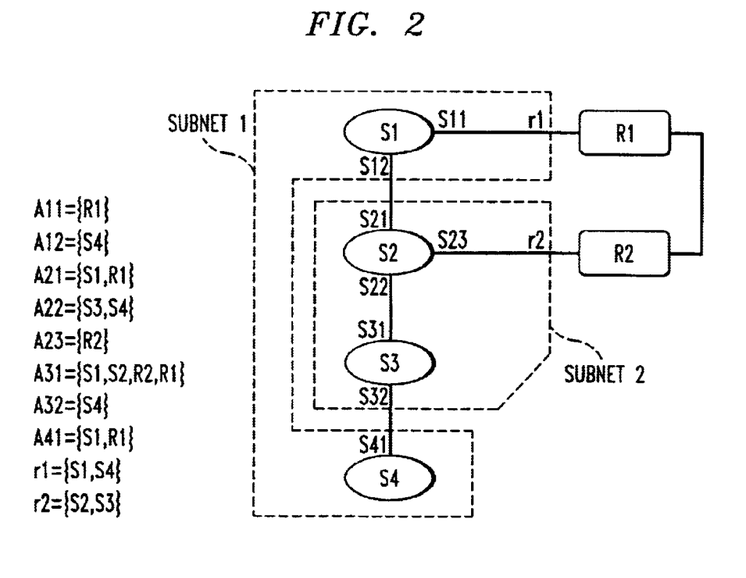
FIG. 2 is a representation of a communication network with two subnets.

Assume in FIG. 2 that switches S1 and S4 belong to subnet 1, while switches S2 and S3 belong to subnet 2. The procedure described above for single subnet switched domains will not be able to connect interfaces S21 to S12, as it should for the topology of FIG. 2. This is because switches S2 and S3 of subnet 2 will not be identified in the address forwarding table A12 for interface S12 of switch Si in subnet 1. That is, since S2 and S3 are associated with a different subnet than S1, frames originating at S2 and S3 for transmission to S1 are routed through R2. Even if the single subnet discovery procedure were modified to state that two interfaces are connected if the union of the address sets includes all switches of one subnet, the procedure would not work. Since A12∪A21, A12∪A31, and A12∪A41 each contain all the switches in subnet 1 in FIG. 2, then interfaces S21, S31, and S41 would all be valid candidates for connection to interface S12, which violates the condition that interface matching must be one-to-one.

The single subnet topology discovery procedure, above, may be extended to account for cases when the procedure uncovers multiple interfaces that are potentially connected to another, single interface. This extension make uses of properties of the known spanning tree algorithm, and enables the choice of interfaces that can be connected to a given interface to be narrowed. Although it is shown below that there are cases where it is impossible to determine a unique topology of switches based only on address forwarding information, it is expected that such cases will be rare.

Figure 3A:
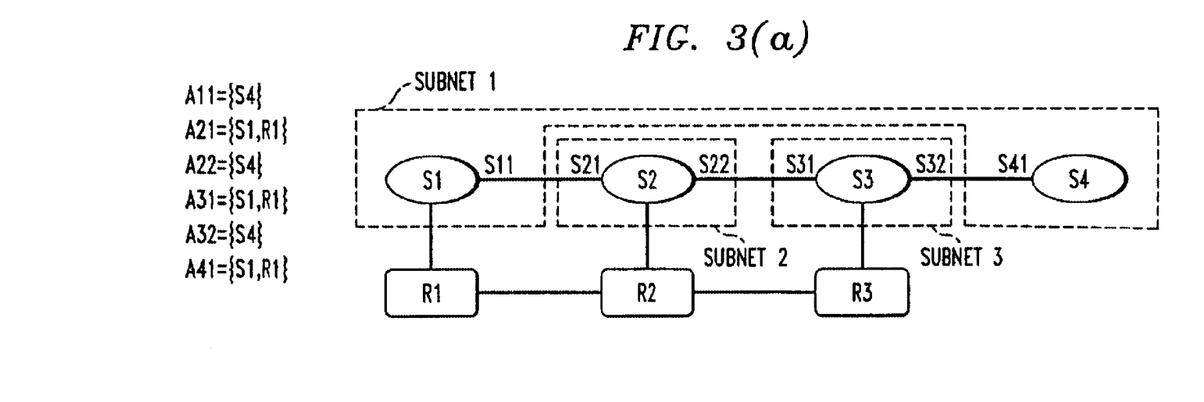
FIG. 3 is a representation of another communication network with three subnets.
Figure 3B:
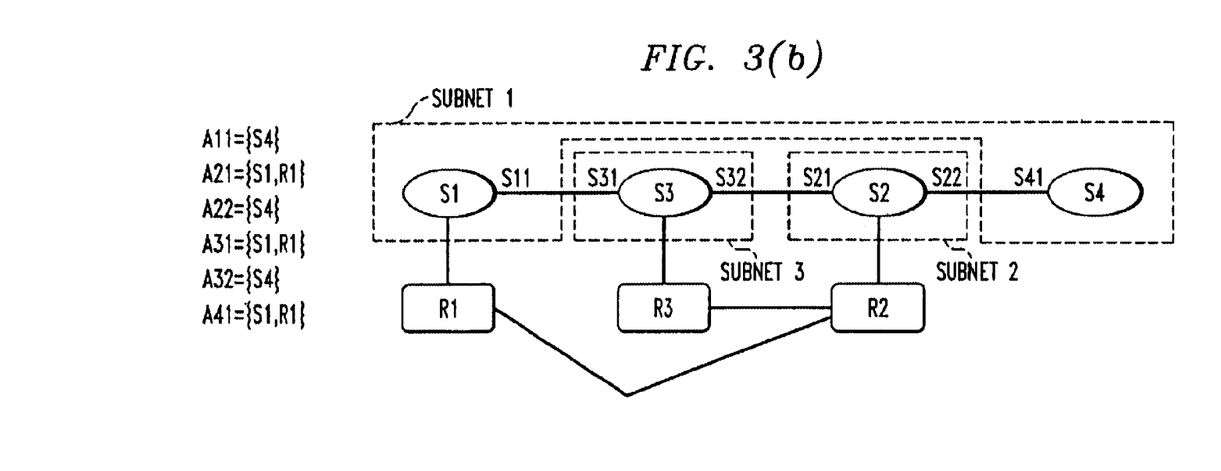

Consider the distinct network topologies depicted in. FIGS. 3(a) and 3(b). Assume that switches S1 and S4 belong to subnet 1, while switches S2 and S3 belong to subnets 2 and 3, respectively. The address forwarding tables for switches in both topologies will be identical, even though S2 is connected to S1 in FIG. 3(a), and S3 is connected to S1 in FIG. 3(b). Thus, any procedure that relies only on address forwarding table information may not distinguish between the two topologies. It is possible, however, to determine a minimal set of candidate topologies that contain the actual network topology.

Properties of Switched Domains containing Multiple Subnets

As mentioned, when discovering a physical topology of switched domains containing multiple subnets, interfaces that cannot be connected are determined and ruled out. The following lemmas identify conditions under which two interfaces cannot be matched, and make use of the following property for switched domains containing multiple subnets:

Suppose Si and Sk are two switches from different subnets; Then Aij contains Sk if and only if there is a node Sp from the same subnet as Sk such that Sp, . . . , Si . . . , Sk is a path in the spanning tree. Let Uijkl denote the union $A_{ij} \cup A_{kl}$.

Lemma (3) Let Sij and Skl be different interfaces. If $A_{ij} \cap A_{kl} \neq \phi$, then interfaces Sij and Skl cannot be matched:

Proof: Suppose to the contrary that switch Sp appears in both Aij and Akl, and interfaces Sij and Skl are connected. Then, there is a path from Sp to Si via Sk, and from Sp and Sk via Si. Further, each of these paths belongs to the spanning tree, which leads to a contradiction. Thus, if two interfaces have non-empty intersections, they cannot be matched.

Lemma (4): Let t be a subnet that contains at least two switches Sp and Sq. If $A_{ij} \cap A_{kl} = \phi$ and Uijkl contains either Sp or Sq, but not both, then the interfaces Sij and Skl cannot be matched.

Proof: Suppose that Sij and Skl are connected. Without loss of generality, let Sp∈Aij. Thus, there must be a path from Sp to Si passing through Sk in the spanning tree. We consider two cases:

1. The path from Sq to Si in the spanning tree does not pass through Sk: In this case, Sq will belong to Akl since the path in the spanning tree from Sq to Sp will pass through Si and Sk, and S1 and Sp belong to the same subnet t.
2. The path from Sq to Si in the spanning tree passes through Sk: In this case, since Sp is in Aij, there must be a switch Sr such that Sp, . . . , Sk, Si, . . . , Sr is a path in the spanning tree and Sr also belongs to subnet t. Thus, it follows that Sq, . . . , Sk, Si, . . . , Sr will also be a path in the tree and Sq will belong to Aij also.

Thus, we have shown above that both Sp and Sq must belong to Uijkl if Sij and Skl are connected, and so the interfaces cannot be connected.

Lemma (5): Let $A_{ij} \cap A_{kl} = \phi$ and $A_{ij} \cap A_{pt} = \phi$. If Uijkl= Uijpt and Si and Sk belong to the same subnet which is different from that of Sp, then Sij and Skl cannot be matched.

Proof: Suppose Sij and Skl are connected. Note that Akl=Apt since $A_{ij} \cap A_{kl} = \phi$, $A_{ij} \cap A_{pt} = \phi$ and Uijkl=Uijpt. Also, since Si and Sk are from the same subnet, Si∈Akl and thus, Si∈Apt. Thus, there must exist a switch Sr, belonging to the same subnet as Si such that Si, Sk, . . . , Sp. . . , Sr is a path in the spanning tree for the subnet. Since Si and Sk belong to the same subnet, however, this implies that Sk∈Apt, which leads to the contradiction that Sk∈Akl.

Topology Discovery Procedure

Assume initially that every candidate pair of interfaces is physically connected. The results of the lemmas presented above are applied next in order to eliminate pairs of interfaces that cannot be matched. Then, for a selected interface, a set of other interfaces are left to which the selected interface may potentially be connected. If, after excluding pairs of interfaces that cannot match, every interface matches only one other interface, a unique physical topology of the network has been computed.

From Lemmas 3, 4 and 5, it follows that for any pair of interfaces Sij and Skl to match, the following must hold:

1. $A_{ij} \cap A_{kl}$ is empty.
2. For every subnet t, $A_{ij} \cup A_{kl}$ contains either all nodes from subnet t, or none of them.
3. If Sij and Skl belong to the same subnet, then there does not exist a switch Sp from a different subnet such that Uijkl=Uijpt and $A_{ij} \cap A_{pt}=\phi$.

For all pairs of potentially matching interfaces Sij and Skl satisfying the above conditions, unions Uijkl are referred to as "valid" unions representing candidate connections. For a valid union Uijkl, if Skl does not occur in any other valid union, then we can conclude that Sij is connected to Skl. As a result, all other valid unions containing Sij can be eliminated. This follows since the set of valid unions represents a superset of the actual connections in the network. Also note that, since between any pair of switches there can be at most one direct active connection, once an interface of Si is connected with an interface of Sk, all other valid unions containing both Si and Sk can be eliminated.

Figure 7A:
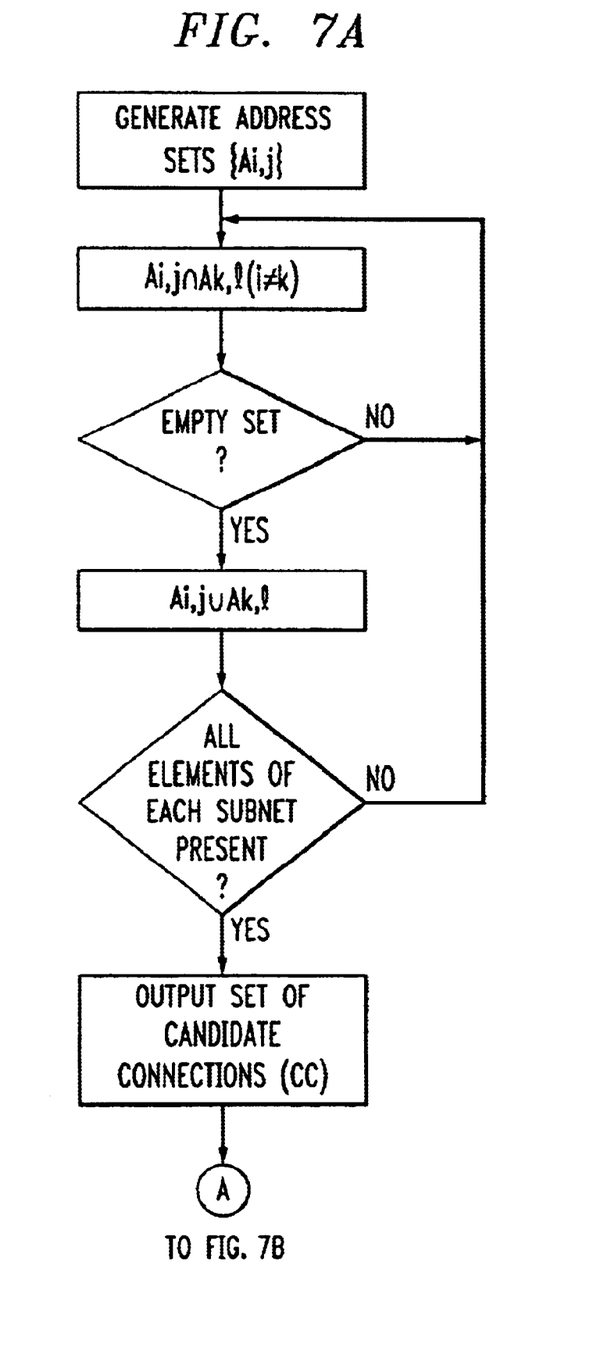
FIGS. 7A & 7B define a general flow chart of a method of discovering a physical topology of a network having multiple subnets.
Figure 7B:
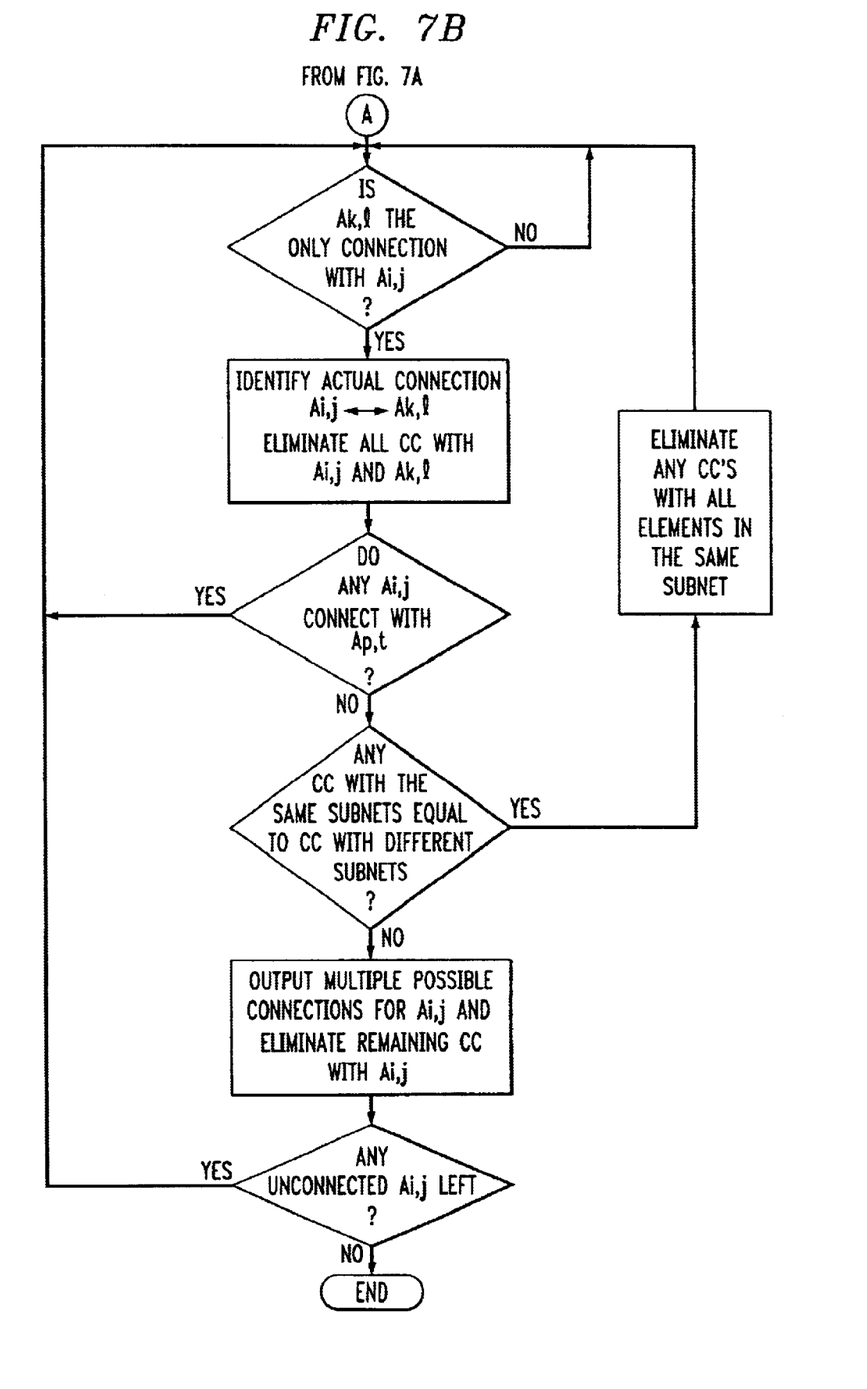

After generating sets of addresses that can be reached from each interface of each element in a multiple subnet network, the present procedure may be summarized as follows. See FIG. 7.
1. Generate an initial set of valid unions U.
2. Repeat the following step until no further valid unions can be deleted from U.
2.1. If an interface Skl occurs in only one valid union Uijkl in U, then (1) delete all valid unions containing Sij from U except for Uijkl, and (2) delete all valid unions Uixky, $x \neq j$, $y \neq l$.
3. For every valid union Uijkl remaining in U, output "Sij connected to Skl".

Connections output by the present procedure are assuredly a superset of the actual connections in the network. As mentioned earlier, for certain networks (see FIGS. 3(a) & 3(b)), it may be impossible to compute the network topology accurately. For such networks, the present procedure may not output a unique network topology, but, rather, output multiple possible connections for a selected interface only one of which is an actual connection in the network. For most practical network topologies, however, the procedure should generate precise topology information in which there is a one-to-one mapping between interface pairs.

The following example shows that while the earlier described topology discovery procedure for the single subnet case cannot produce the correct topology for the 2-subnet network in FIG. 2, the above multiple subnet procedure will identify the network topology correctly.

EXAMPLE 1

Consider the network of FIG. 2. Switches S1, S4 and router R1 belong to subnet 1, while switches S2, S3 and router R2 belong to subnet 2. There is a single interface (S11) that contains only R1, and a single interface (S23) that contains only R2. Consequently, S11 is matched with R1, and S23 is matched with R2. The remaining sets of addresses Aij are listed below.

| | |
|---|---|
| $A_{12}$ | $S_4$ |
| $A_{21}$ | $S_1, R_1$ |
| $A_{22}$ | $S_3, S_4$ |
| $A_{31}$ | $S_1, S_2, R_1, R_2$ |
| $A_{32}$ | $S_4$ |
| $A_{41}$ | $S_1, R_1$ |

Valid unions (candidate connections) are as follows:

| | |
|---|---|
| $U_{1221}$ | $S_1, S_4, R_1$ |
| $U_{2231}$ | $S_1, S_2, S_3, S_4, R_1, R_2$ |
| $U_{3241}$ | $S_1, S_4, R_1$ |

Note that U1231={S1, S2, S4, R1, R2} is not a valid union due to Lemma (4) since it contains switch S2 but not switch S3 which belongs to subnet 2. Further, U1241={S1, S4, R1} is also eliminated due to Lemma (5) since U1241=U1221 and switches S1 and S4 belong to the same subnet, while S1 and S2 belong to different subnets. Since every interface occurs only once in the above set of valid unions, S12 is matched with S21, S22 is matched with S31, and S32 is matched with S41.

Characterization of Identified Topologies

A class of networks for which the present multiple subnet topology discovery procedure will identify a unique physical topology, are defined herein as "ordered" networks. Also, a set of addresses A are defined to be legal if, for any subnet t, A contains either all or none of the addresses in t.

Specifically, a network is an ordered network if it can be arranged as a tree that satisfies the following two properties:
1. For each subtree in the network tree, and for each subnet contained in the subtree, there exists a node belonging to the same subnet in another subtree of the network.
2. For any two subtrees rooted at switches Si and Sk in the network, if the union of address in the two subtrees is legal, then the switches Si and Sk belong to the same subnet and their parents also belong to the same subnet.

Denote a connection between interfaces Sij and Skl wherein Si is a parent of Sk in the network tree, by <Sij, Skl>. A pair of subtrees are "legal" subtrees if the union of addresses in the subtrees is legal. The first property of ordered networks ensures that for a connection <Sij, Skl>, the address table Aij contains all the addresses in the subtree rooted at Sk. The second property, by requiring that roots and parents of a pair of legal subtrees belong to the same subnet, ensures that valid unions which do not correspond to matching connections are eliminated by the topology discovery procedure. This requirement is not too restrictive, since most networks will likely contain few pairs of legal subtrees. Furthermore, it is trivially satisfied in networks that do not contain pairs of legal subtrees, or networks in which each subnet occurs in more than two distinct subtrees of the root.

Figure 4:
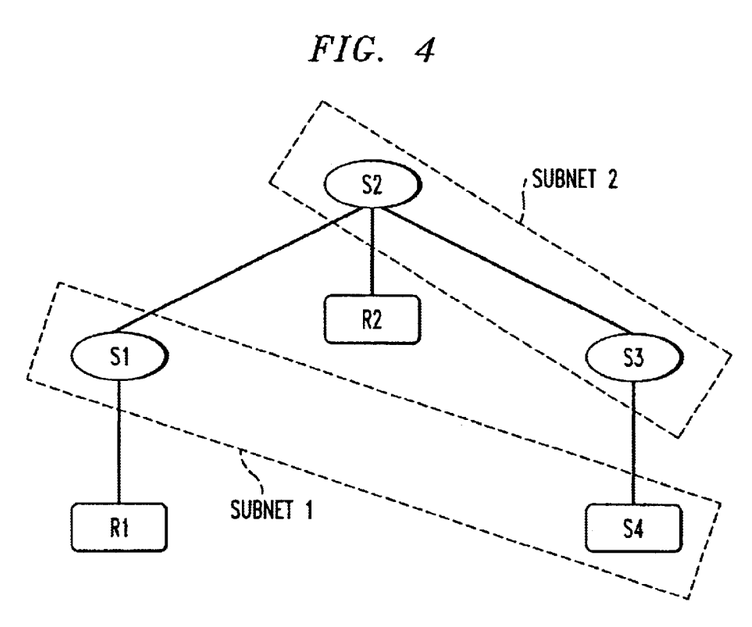
FIG. 4 is a representation of an ordered communication network.

The network depicted in FIG. 2 is an ordered network. Consider the network in FIG. 2 arranged as a tree with switch S2 as the root, as re-drawn in FIG. 4. Note that for each subtree in the network tree, there is a node assigned to a subnet that extends to another subtree of the network. For example, consider the subtree rooted at S1. Node S4 belongs to the same subnet as S1, but is not contained in the same subtree. Also, the network satisfies the second property of the ordered network definition. To see this, note that the subtrees rooted at switches S1 and S4 constitute a pair of legal subtrees since they contain all the addresses in subnet 1. The parents S2 and S3 of switches S1, S4 also belong to the same subnet (subnet 2). The following discussion demonstrates that the present topology discovery procedure produces an accurate physical topology for ordered network graphs.

In ordered networks, for any connection <Sij, Skl>, Aij is the set of addresses that appear in the subtree rooted at Sk. Also, Akl is the set of addresses belonging to subnets in Sk's subtree that are not contained in Aij. We refer to these addresses as the complement of Aij and denote them by Āij. Note that Aij∪Āij is legal. Thus, Akl=Āij and Aij=Ākl.

In an ordered network, for any distinct pair of switch connections <Sij,Skl> and <Spq,Suv>, Aij≠Apq and Akl≠Auv. As a result, for the connection <Sij, Skl>, there can exist at most one other connection <Spq,Suv>such that Aij=Auv and Akl=Apq. In this case, the subtrees rooted at Sk and Su constitute a pair of legal subtrees. Furthermore, these connections can result in the following four valid unions that are all equal, namely, Uijkl, Uijpq, Upquv and Ukluv. Of these, Uijpq and Ukluv can be deleted since Si and Sp belong to the same subnet, and Sk and Su also belong to the same subnet (due to the second property of ordered networks). It must be shown that the valid unions Uijkl and Upquv will not be deleted, however. To accomplish this, Si and Sk must be shown to belong to different subnets. A similar argument can be used to show that Sp and Su also belong to different subnets. If Si is in the same subnet as Sk, then Si must belong to Skl. Since Skl=Spq, however, Si must be in the subtree rooted at Su. This would mean that Sk is in the subtree rooted at Su, and that Sk∈Spq, which is impossible since Skl=Spq.

Figure 5:
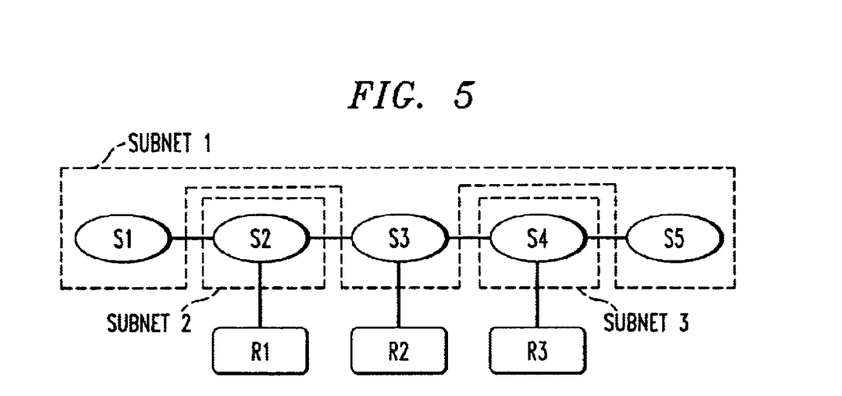
FIG. 5 is a representation of a communication network that is not ordered.

The present topology discovery technique can also find an accurate topology of networks that may not be ordered. FIG. 5 depicts one such network. In the figure, switches S1, S3, S5 and router R2 belong to subnet 1; switch S2 and router R1 belong to subnet 2; and switch S4 and router R3 belong to subnet 3. For every possible network tree, one of subnets 2 or 3 will be entirely contained in a single subtree. Thus, the network cannot be ordered. The present technique will, however, accurately discover the physical topology of the network. Thus, ordered networks are only a subclass of a broader class of networks for which the present technique will identify a unique physical network topology.

Extensions

The following shows how the topology discovery procedures disclosed above can be extended to handle incomplete address forwarding tables, and VLANs.

Dealing With the Completeness Requirement

Thus far, it was assumed that each address forwarding table Aij was complete, i.e., that it contained all MAC addresses reachable from node Si through the node interface Sij. In practice, however, this condition may not always be true. One reason is that although the tables are learned based on source addresses in frames received at the interface Sij, the learned entities are aged (and removed) by the switches. Therefore, unless a switch constantly receives packets from a source at intervals less than the aging interval (typically 5 minutes), the switch may delete the entry corresponding to that source, leaving the forwarding table for interface Sij incomplete.

Two complementary solutions to the above problem are presented. The first attempts to keep the Aij's as complete as possible, while the second attempts to handle minor deviations from completeness. Together, the solutions ensure that the present technique will work satisfactory in practice.

The first solution involves generating constant traffic between any pair of switches in the switched domain and, consequently, not allowing the address forwarding table entries to age. For example, traffic from a node X to a node Y can be. generated in response to an ICMP (Echo Request) message from a network management station to node X, with the source address in the ICMP packet set to the IP address of node Y. This will cause node X to respond to the Echo Request by replying to Y. A minor modification of publicly available code for generating ICMP messages to build the appropriate IP header for the ICMP Echo Request, can be performed by persons skilled in the art. The second solution remedies minor deviations from completeness, by choosing to match interface Sij with interface Skl when Aij∩Akl=φ, and Aij∪Akl contains either no switches from each subnet, or a reasonably large (user-defined) fraction of the switches in the subnet.

Handling VLANs

Virtual LANs (VLANs) define multiple spanning trees within a switched domain. A switch may belong to multiple VLANs, and effectively maintain address forwarding tables for each VLAN of which it is a part. Frames belonging to a specific VLAN are forwarded by a switch using forwarding tables produced for that VLAN.

Therefore, with access to the address forwarding tables for interface Sij for each VLAN, the present topology discovery process can be repeated for each VLAN to generate a spanning tree for the VLAN. Care should be taken to stay within the universe of addresses comprising only MAC addresses in each VLAN. Even though standard SNMP MIBs usually do not provide information on address forwarding tables for individual VLANS, such information can be collected using proprietary MIBs (for example, the Prominent MIB for Cajun Switches).

The following example demonstrates that, even in the presence of multiple subnets and VLANs in a switched domain, and in the absence of specific information on forwarding tables for each VLAN, the present, multiple subnet topology discovery technique will identify the correct physical network topology.

EXAMPLE 2

Figure 6:
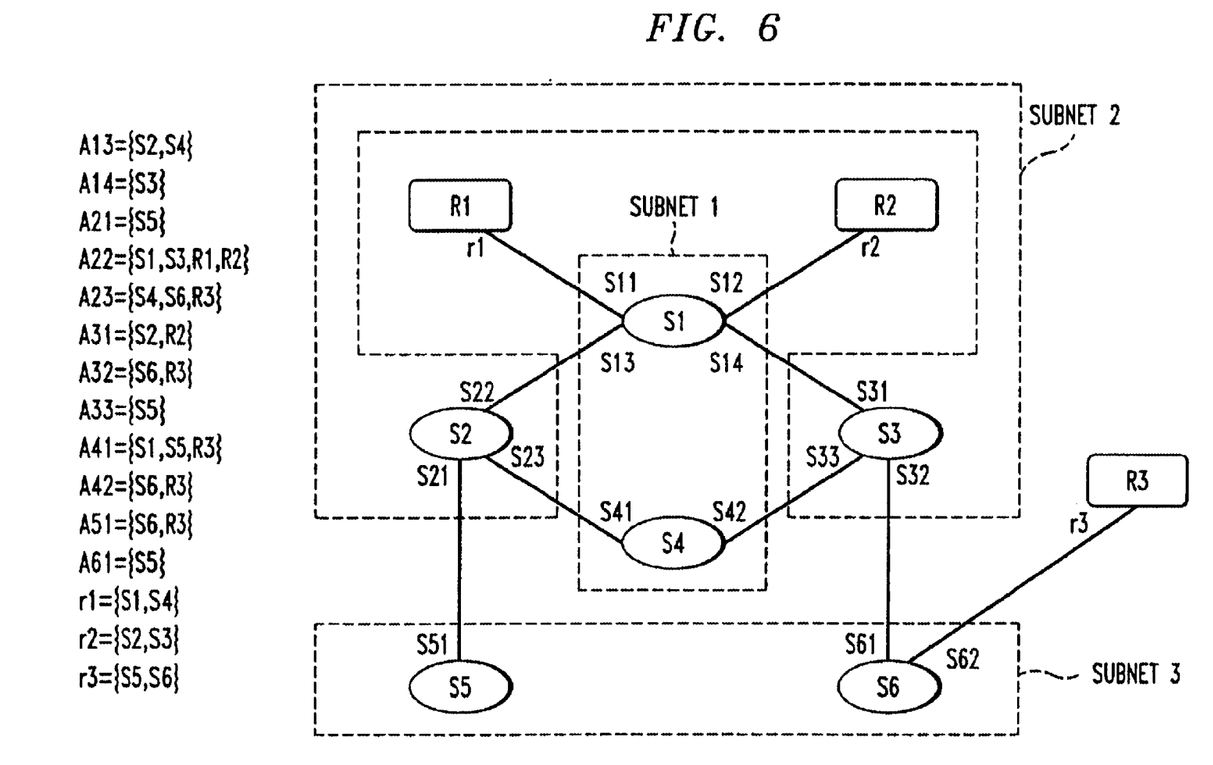
FIG. 6 is a representation of a communication network containing virtual local area networks (VLANs) having multiple subnets.

Consider the network depicted in FIG. 6. Switches S1, S4, and router R1 belong to subnet 1; switches S2, S3, and router R2 belong to subnet 2; and switches S5, S6, and router R3 belong to subnet 3. In addition, there are 3 VLANs, one for each subnet. The first VLAN includes the path R1, S1, S2, S4; the second includes the tree involving router R2 and switches S1, S2 and S3; and the third includes the path R3, S6, S3, S4, S2, S5. The address forwarding tables for the interfaces, without taking into account VLAN information, are also shown in FIG. 6.

There are single interfaces that contain only R1 or R2, or R3. Consequently, these interfaces, r1, r2 and r3 are matched respectively with S11, S12, and S62, and are eliminated from further consideration. The set of valid unions is as follows:

| | |
|---|---|
| U1322 | S1,S2,S3,S4,R1,R2 |
| U1431 | S2,S3,R2 |
| U2142 | S5,S6,R3 |
| U2341 | S1,S4,S5,S6,R1,R3 |
| U2151 | S5,S6,R3 |
| U3261 | S5,S6,R3 |
| U3342 | S5,S6,R3 |
| U3351 | S5,S6,R3 |
| U4261 | S5,S6,R3 |

The valid unions U1322, U1431, and U2341 all contain interfaces that appear only once in the set of unions. Consequently, S13, S14 and S23 are matched with S22, S31, and S41, respectively. Thus, union U2142 is eliminated since S23 is already matched with S41. Deletion of U2142 causes U2151 to be selected (since interface S21 appears only once). Thus, in the next iteration, U3351 is deleted. In the final iteration, among the remaining unions, since interfaces S32 and S33 occur only once, U3261 and U3342 are retained, while U4261 is eliminated. Thus, the final set of valid unions yields the actual topology of the network.

A practical procedure for discovering physical topology in heterogeneous IP networks, has been described. The procedure uses local address forwarding information routinely collected in the SNMP MIBs of routers and switches, and "stitches" such information together to produce a global layer-1 topology of a given network. The procedure can handle switched domains each comprising one or more subnets, and can be readily extended to deal with incomplete information and Vs.

While the foregoing description represents preferred embodiments of the invention, it will be obvious to those skilled in the art that various changes and modifications may be made, without departing from the spirit and scope of the invention pointed out by the following claims.

We claim:

1. A method of discovering a physical topology of a network having a number of network elements each of which is assigned to one of a number of bridged LAN segments, where the bridged LAN segments are organized into a plurality of subnets within the network, wherein each network element has one or more interfaces each of which is physically linked with an interface of another network element, the method comprising:

generating address sets comprising address forwarding table information for each interface of each network element, wherein members of a given address set correspond to network elements that can be reached from the interface for which the given address set was generated;

comparing the members of first address sets generated for corresponding interfaces of a given network element with members of second address sets generated for corresponding interfaces of network elements other than the given network element, and determining a set of candidate connections between one or more interfaces of the given network element and one or more interfaces of another network element wherein, for each candidate connection, (a) none of the members of a first address set is also a member of a second address set, and (b) the members of the first address set and the members of the second address set collectively represent all network elements assigned to each subnet represented by the members of the first and the second address sets; and if only one candidate connection is determined between a first interface of the given network element and a second interface of another network element, identifying the one candidate connection as an actual connection between the first and the second interface, and eliminating from the set of candidate connections those connections with other network elements which are in the same subnet as the given network element when more than one candidate connection is determined.

2. The method of claim 1, wherein, if after said eliminating step there is only one remaining candidate connection, identifying the one remaining candidate connection as an actual connection between the first interface of the given network element and the determined interface of the other network element.

3. The method of claim 1, wherein, if after said eliminating step there is more than one remaining candidate connection, further eliminating from the set of candidate connections those connections that include interfaces that are part of a previously identified actual connection, thus providing a set of possible connections for the first interface.

4. The method of claim 3, including arranging the switches in groups of switched domains.

5. The method of claim 4, wherein each switched domain is associated with one or more subnets.

6. The method of claim 1, including providing some of the network elements in the form of switches.

7. The method of claim 6, including providing some of the network elements in the form of routers and arranging the routers to communicate traffic between switches assigned to different subnets.

8. The method of claim 1 wherein the address set generating step includes producing predetermined network traffic that enters the interfaces of selected network elements.

9. The method of claim 8, including producing the network traffic via an echo request message.

10. The method of claim 1, wherein the address set generating step includes accessing a network management information base containing information relating to the interfaces of the network elements.

11. The method of claim 1, including providing the connections between the interfaces of the network elements in the form of wired links.

12. The method of claim 1, including providing the connections between the interfaces of the network elements in the form of optical fiber links.

13. The method of claim 1, including providing the connections between the interfaces of the network elements in the form of wireless links.

14. The method of claim 1, including forming a number of virtual local area networks (VLANs) within said network.

* * * * *